United States Patent
Wang

[19]

[11] Patent Number: 6,160,327
[45] Date of Patent: Dec. 12, 2000

[54] WINDING FOR LINEAR MOTORS WITHOUT SLOTS

[75] Inventor: Xin Tian Wang, Central Islip, N.Y.

[73] Assignee: Kollmorgen Corporation, Waltham, Mass.

[21] Appl. No.: 09/055,545

[22] Filed: Apr. 6, 1998

[51] Int. Cl.⁷ .................................................. H02K 41/00
[52] U.S. Cl. .............................................. 310/12; 310/42
[58] Field of Search ................................. 310/12, 13, 14, 310/268, 51; 318/135

[56] References Cited

U.S. PATENT DOCUMENTS

| Re. 34,674 | 7/1994 | Beakley et al. | 310/12 |
| 3,746,899 | 7/1973 | Eastham | 310/12 |
| 4,151,447 | 4/1979 | von der Heide et al. | 318/135 |
| 4,249,114 | 2/1981 | Popov et al. | 318/115 |
| 4,408,145 | 10/1983 | Artemenko et al. | 318/135 |
| 4,749,921 | 6/1988 | Chitayat | 318/135 |
| 5,087,844 | 2/1992 | Takedomi et al. | 310/12 |
| 5,519,266 | 5/1996 | Chitayat | 310/12 |
| 5,723,917 | 3/1998 | Chitayat | 310/12 |

FOREIGN PATENT DOCUMENTS

| 0 704 955 A2 | 4/1996 | European Pat. Off. | H02K 41/02 |
| 26 58 535 A1 | 6/1978 | Germany | H02K 41/02 |

OTHER PUBLICATIONS

European Search Report for EP 98 12 2360 (Jul. 23, 1999) related to U.S. Application Serial No. 09/055,545.

Derwent Abstract of DE 26 58 535.

*Primary Examiner*—Nestor Ramirez
*Assistant Examiner*—Judson H. Jones
*Attorney, Agent, or Firm*—Morgan & Finnegan, LLP

[57] ABSTRACT

A linear motor utilizing a flat, ironless, coil winding which can be of the printed circuit type (stamped, etched, or deposited and adhered to a rigid substrate). The winding provides coils that are relatively movable between straight, parallel rows of magnets. The winding can also be fabricated using insulated wire to form a distributed winding. In designing the winding particular attention is paid to the length of the straight portion perpendicular to the direction of the linear motion ($L_M$) compared to the height of the linear air gap ($L_B$) and the outside dimension of the winding ($L_S$). Selection of these dimensions determines four key motor parameters, namely, the motor back emf $K_e$, the motor force constant $K_f$, the winding resistance R, and the motor force ripple $F_r$.

7 Claims, 7 Drawing Sheets

The main straight portion $L_M = 1 \cdot L_B$

The main straight portion $L_M = 0.5 \cdot L_B$

The main straight portion $L_M = 0 \cdot L_B$

WINDING FOR LINEAR MOTORS WITHOUT SLOTS

BACKGROUND OF THE INVENTION

The present invention relates to linear motors of the type including two parallel ferromagnetic plates with a coil positioned between them. When the coil is energized, a linear movement is produced by the interaction of the energized coil and the magnetic flux from the ferromagnetic plates. The coil may be a single phase or polyphase winding and the ferromagnetic plates may generate the magnetic field by permanent magnets or by electromagnetic induction.

The winding according to the linear motor of this invention contains no permeable material. As such, it is 'slotless' or 'ironless' and has the advantage of very light weight and zero cogging. Several motors of this general type are known including motors disclosed by von der Heide (U.S. Pat. No. 4,151,447) who discloses the general construction and advantages of such linear motors, Chitayat (U.S. Pat. No. 4,749,921) who discloses an improved construction method and the addition of cooling, and Beakley (U.S. Pat. No. Re 34,674) who discloses an alternate construction with overlapping coils.

In motors of this type the coil is typically molded in epoxy and/or retained by a non-magnetic plate (such as in Chitayat) which provides a convenient means of positioning and mechanically retaining the coil between the ferromagnetic plates.

Although this type of ironless linear motor has been in existence for some time, very little has been done to optimize the coil pattern in order to improve performance. Having no slots to constrain the coil, complete freedom exists to adjust the coil windings to almost any pattern that is of advantage for performance or manufacturing benefits.

It is significant to note, for example, that Beakley teaches that the coil is substantially perpendicular to the longitudinal axis of the ferromagnetic plate (perpendicular to the direction of motion) and Chitayat teaches that the coil contains substantially straight runs. While it is conventional to consider that straight coils perpendicular to the longitudinal axis produce the maximum force, it is not always advantageous to use such a construction, particularly in a linear motor where motor heating is of concern.

SUMMARY OF THE INVENTION

It is an object of this invention to provide alternate coil patterns that produce higher performance and present advantages over prior commonly-used patterns.

The linear motor according to the invention utilizes a flat, ironless, coil winding which can be of the printed circuit type. Such a winding can be stamped, etched, or deposited and adhered to a rigid substrate. The winding provides coils that are relatively movable between straight, parallel rows of stationery magnets. The winding can also be fabricated using insulated wire to form a distributed winding. Furthermore, the winding can consist of multi-turn coils which overlap one another.

The armature conductor pattern is generally continuous over the length of the winding. The winding can be either a lap or wave configuration with one half of each coil on one side of a substrate and the next half of each coil being on the other side of the substrate. The coils can have a large variety of configurations. As long as each coil is the same, there is very little wasted space in the air gaps. The conductor patterns for distributed wire or multi-turn windings can be mounted on one side of a support.

In designing the winding according to the invention, particular attention is paid to the length of the straight portion perpendicular to the direction of the linear motion ($L_M$) compared to the height of the linear air gap ($L_B$) and the outside dimension of the winding ($L_S$). Selection of these dimensions determines four key motor parameters, namely, the motor back emf $K_e$, the motor force constant $K_f$, the winding resistance R, and the motor force ripple $F_r$.

BRIEF DESCRIPTION OF THE DRAWINGS

The foregoing and other objects of the invention are achieved as described in the following detailed specification which includes the drawings wherein.

DETAILED DESCRIPTION

Figure 1:
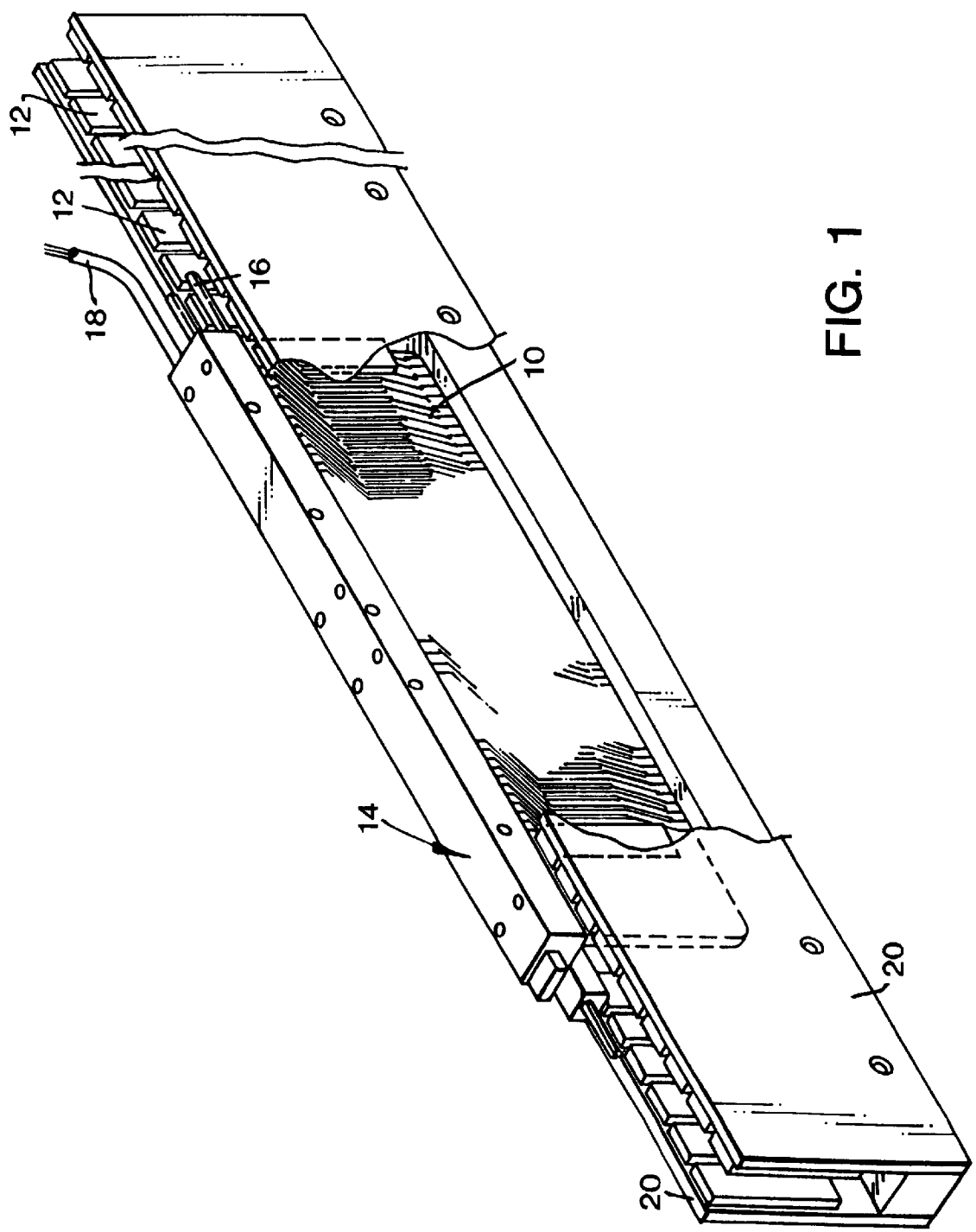
FIG. 1 is a perspective view of a linear motor structure according to a preferred embodiment.

The general linear motor structure according to a preferred embodiment of the invention is illustrated in FIGS. 1 and 2A–2D. The linear motor includes a moving coil (or "slider") 10 that is a stamped, deposited or etched winding on an insulated substrate. The slider 10 is accommodated in the air gap 17 between parallel arrays of permanent magnet field members 12. The permanent magnets are mounted on back iron members 20 which provide a flux return path for the magnets. There is no limit to the length of the winding or the length of the permanent magnet field arrays.

Winding 10 is a "printed circuit" type structure which can be either a stamped, deposited, or etched conductor pattern that is interconnected to create a complete winding with any desired number of effective coils. Winding 10 is mounted in the slider carriage which can be moved by sliding along rods 16 which are secured to the stationary magnet and back iron structure at the ends.

Figure 2A:
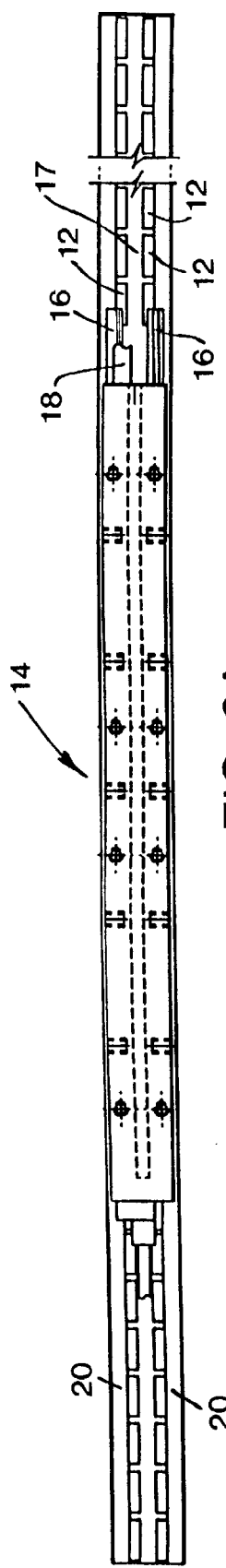
FIGS. 2A–2D are top, bottom, plan and end views of the linear motor shown in FIG. 1.
Figure 2B:
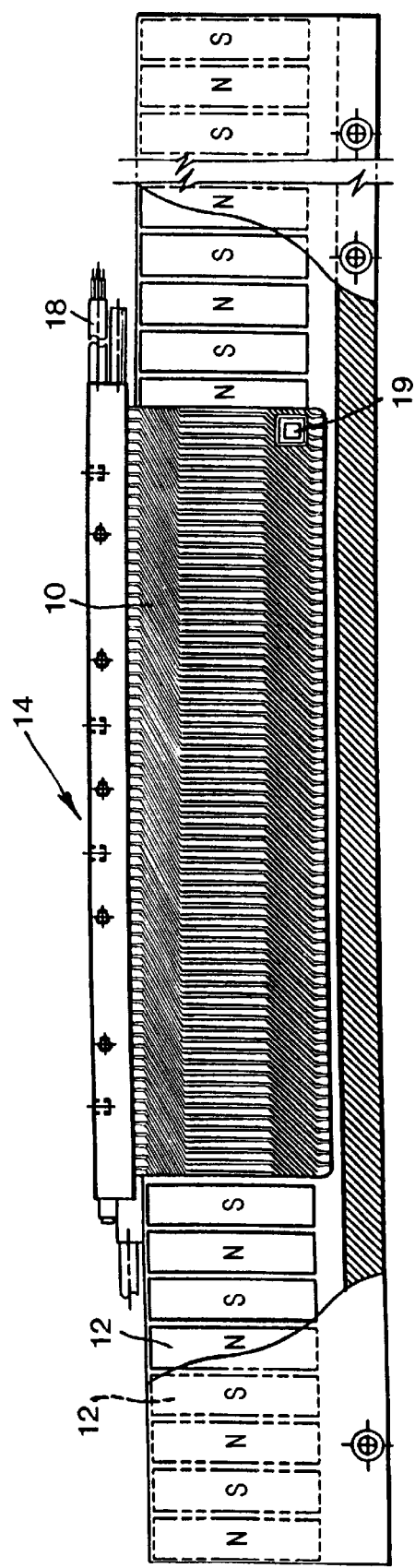
Figure 2C:
Figure 2D:
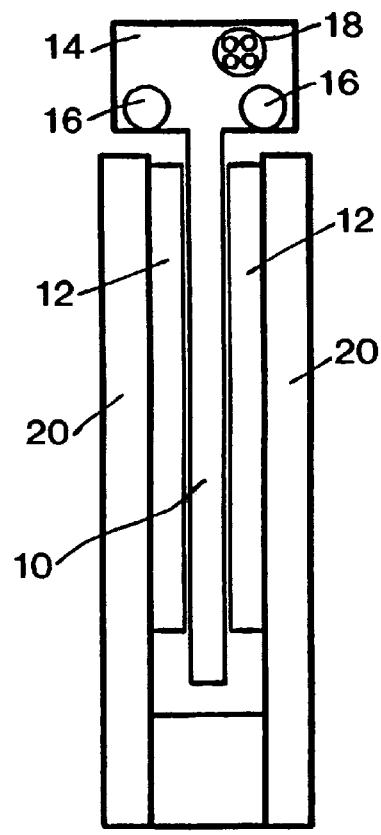

As shown in FIG. 2A–C, the coil conductors typically have a rectangular cross section and are bonded to a thin, high strength, insulating layer substrate 26, preferably by a resin epoxy. The substrate can be any electrical insulation material, but typically consists of materials such as Fiberglass, Mylar, Kapton or Nomex insulation. The resulting construction is extremely rigid with a high mechanical stiffness in both the direction of travel and parallel to the magnetic flux path. As such, the winding is self-supporting without the need for any further mechanical support. The winding can be encapsulated in an epoxy-type or plastic material for better thermal properties, but such encapsulation is optional and is not needed for mechanical support.

When the windings are mechanically stamped from a copper sheet, the manufacturing cost is very low. The stamped pattern is adhesively adhered to the insulating substrate, and then the bridging connections between conductors on opposite sides of the substrate are made by welding. In an alternate construction the conductor patterns may be created by depositing the copper pattern on a substrate such as a PC board or by etching the pattern into a copper-clad board. The etched or deposited conductor patterns on opposite sides of the substrate can be interconnected by through hole plating.

The air gap flux, and therefore the motor force constant Kf, are a direct function of the air gap between the poles of the facing magnets. A thinner winding structure is generally desirable to increase the motor force constant and to reduce the slider weight. An increase in the motor force constant Kf and the reduced weight of the slider enhance performance and increase the possible acceleration.

Several techniques can be used to provide commutation of armature winding 10 in the moving slider. A moving cable 18 (FIG. 1) on the slider 14 can be used to bring power to the armature winding coils in the correct sequence. The number of coils in the armature winding depends on the application and the amount of force and travel needed. A single phase coil is sufficient to create linear movement. However, for continuous movement over longer distances several coils are preferably connected in a number of phases. The phases of the winding are electronically commutated. A sensor 19 is typically attached to or is embedded in the moving armature to sense the position of the winding relative to the stationary magnets. The sensors may be optical, magnetic, capacitive, or inductive. A typical application employs Hall effect sensors to sense the magnet location. Another possible arrangement is to use the armature- generated back EMF to indicate position. Using the correct ratio of magnet pitch to coil pitch, the back EMF can be modified to the desired wave shape which, in most cases, is sinusoidal. Electronic commutation is well known in the art and is employed in many rotary and linear motors to eliminate the need for mechanical brushes. A transistor array (not shown) is built into slider 14 and energizes the winding coils in the correct sequence as indicated by sensor 19.

Figure 3C:
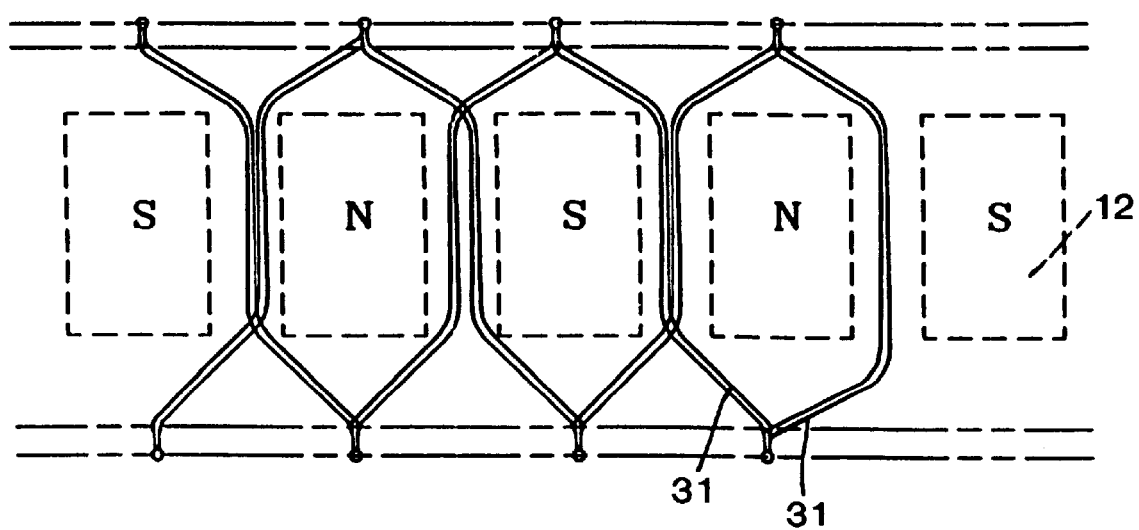
FIG. 3C illustrates the relationship of the armature coils to the permanent magnets.
Figure 3A:
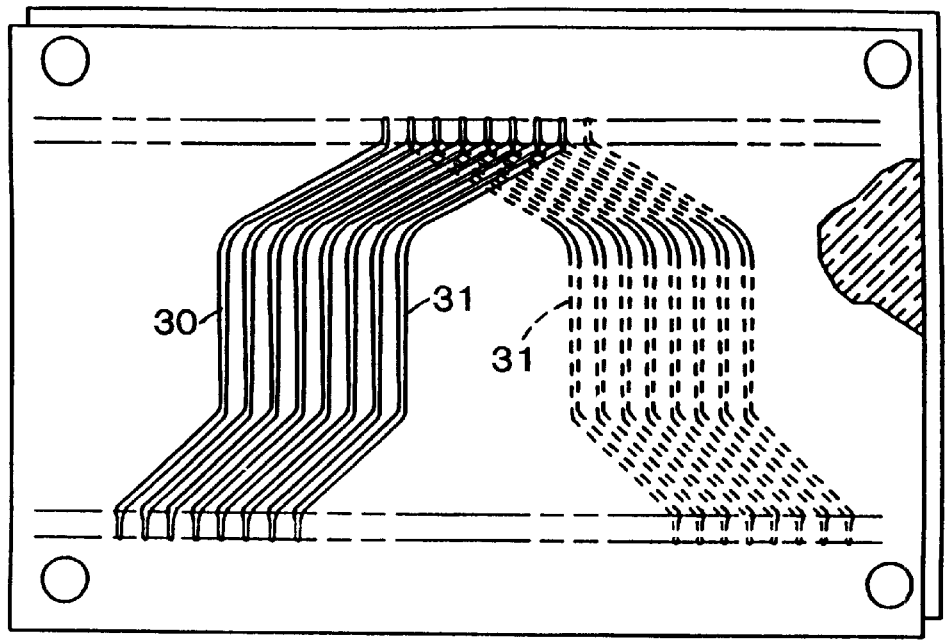
FIG. 3A illustrates a distributed wave winding configuration.
Figure 3B:
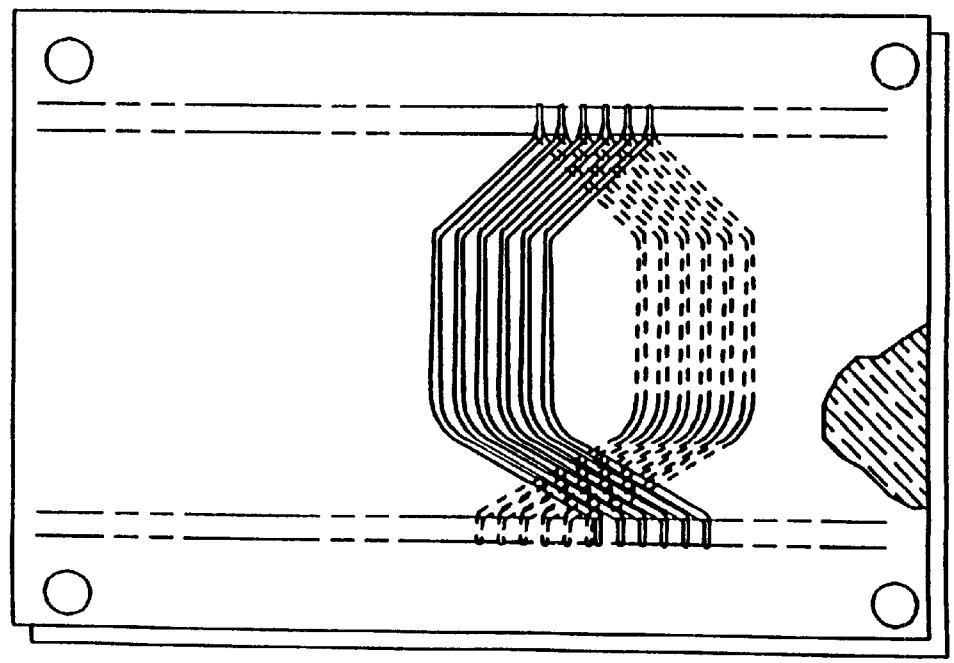
FIG. 3B illustrates a distributed lap winding configuration.

The armature winding conductor pattern can be a wave winding configuration where a conductor 30 of a coil 31 spans approximately the distance between adjacent pole face centers as shown in FIG. 3A. The conductor pattern can also be of a lap configuration as shown in FIGS. 3B and 3C. The spatial relationship of the armature winding coils to the permanent magnets is shown in FIG. 3C. Generally, the coil span is approximately equal to the distance between adjacent magnet pole centers. However, other arrangements are possible to, for example, adjust the shape of the motor back emf. Each coil consists of a pair of conductors located on opposite sides of insulating substrate 26. In the case of stamped, etched or laser cut conductor patterns in which the ends of the conductors extend beyond the insulating substrate, the conductor ends can be welded to form bridging connections. In the case of deposited or etched conductor patterns on a substrate, the connections between conductors on opposite sides of the insulating substrate can be made by through hole plating interconnections.

Figure 4A:
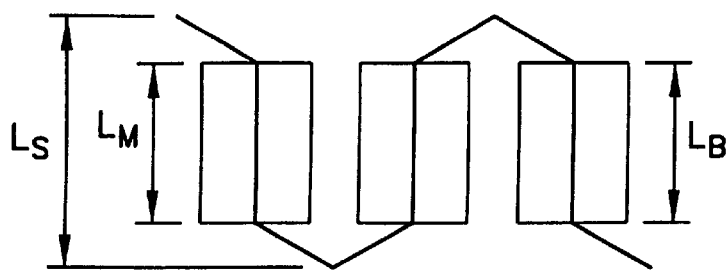
FIGS. 4A to 4C illustrate distributed windings according to the invention with straight portions perpendicular to the direction of movement being of different lengths.
Figure 4B:
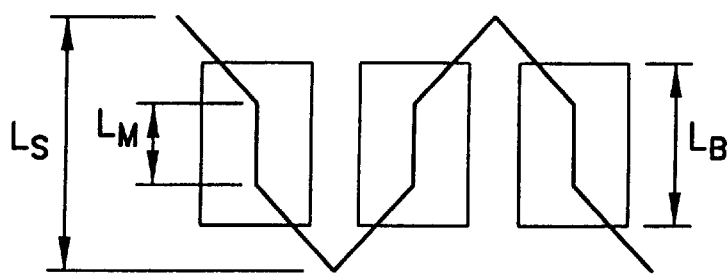
Figure 4C:
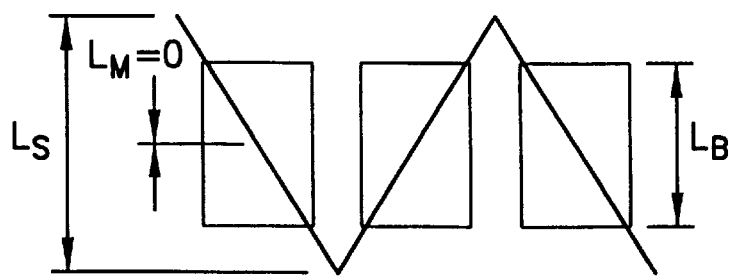

By adjusting the conductor pattern in the wave and or the lap configuration, the important performance characteristics in the motor can be selectively optimized as shown in FIGS. 4A to 4C. Referring to FIG. 4A, which is a wave configuration, the ratio of the straight portion of the conductor Lm perpendicular to the direction of movement to the overall height of the air gap Ls can be adjusted as desired. Adjusting this ratio affects four key motor parameters, namely, the motor back emf Ke, the motor force constant Kf, the winding resistance R, and the motor force ripple Fr. Selected performance characteristics can be optimized by adjusting the Lm to Ls ratio. One of the advantages of the invention is that this ratio can be easily adjusted as required. For example, reducing the Lm to Ls ratio to 0 (FIG. 4C) creates a helical type winding and produces the lowest winding resistance. This can be advantageous in designs where it is important to reduce motor Joule losses.

As another example, the motor force constant can be optimized by using a high Lm to Ls ratio (approaching 1.0, as shown in FIG. 4A) such that the conductor straight portion is long and orthogonal to the direction of motion.

Additionally, adjusting the Lm to Ls ratio has an important effect on the motor back emf wave shape, and thereby, the motor force ripple. For example, when the Lm to Ls ratio is high (approaching 1.0, as shown in FIG. 4A), the motor back emf wave shape tends to be more trapezoidal. This wave shape is also affected by the magnet width and the winding pitch. As the Lm to Ls ratio approaches 0, the back emf wave shape becomes more sinusoidal. Adjusting this back emf wave shape according to the intended drive electronics is a significant factor in reducing the motor force ripple. The flexibility of the proposed design allows for the practical elimination of motor force ripple.

Maintaining the coil active length perpendicular to the magnetic flux lines emanating from the ferromagnetic plates produces the maximum generated force for a given current energizing the winding. However, considering only the maximum force without concern for heating of the winding is not an effective way to optimize the performance of a linear motor. Linear motor applications typically require that the coil be in close proximity to the moving load, thereby directly passing heat to the moving load. Linear motors according to the invention can be optimized by considering both maximum force and heat generated.

The proper parameter for making this determination is the motor constant $Km(Newtons/Watt^{1/2})$. Optimizing the motor constant Km allows for a maximum developed force for each watt of dissipated heat.

In addition, since in many polyphase linear motors the energizing current is applied sinusoidally, it is desirable to minimize variations in the developed force by optimizing the motor back emf function to be as sinusoidal as possible. For example, for a three phase linear motor, it can be shown that:

$\text{Force}(t) = F_a(t) + F_b(t) + F_c(t)$ where $F_n$ = Force developed by each phase $= e_a(t) \cdot i_a(t) + e_b(t) \cdot i_b(t) + e_c(t) \cdot i_c(t)$ where $e_n(t)$ = Bemf of each phase $i_n(t)$ = Current applied to each phase If: $i_a(t) = \sin(\omega t)$ $i_b(t) = \sin(\omega t - 120°)$ $i_c(t) = \sin(\omega t - 240°)$ Then: $F(t)$ = Constant only if: $e_a(t) = \sin(\omega t)$ $e_b(t) = \sin(\omega t - 120°)$ $e_c(t) = \sin(\omega t - 240°)$ If the phase currents applied to each phase are sinusoidal, with three-phase operation the total developed force is consistent (no variations in developed force) only if the motor back emf is also sinusoidal. Where minimum force ripple is important, the motor back emf and the resultant force ripple should also be considered.

By adjusting the coil pattern and the distribution of the windings according to the present invention, the motor constant Km and the motor force ripple when driven by a sinusoidal current can be optimized and performance increased. This is particularly true in polyphase linear motors of this type which use individual coils, whether overlapping or non overlapping, to create the coil assembly.

For the purpose of improving motor constant Km, a continuous winding that is distributed over the entire length of the active assembly has a distinct advantage over individual coils where multiple turns are wound in place. Such multi-turn coils have a poor spatial distribution with unusable space particularly at the coil centers. The spatial distribution can be improved by using overlapped coils, but this arrangement requires long end turns which also produce undesirable resistance to each phase.

The winding configuration that avoids these problems while optimizing Km for the same active volume is a distributed winding as shown in FIG. 3B. Such a continuous distributed winding can be made either with conventional round or square wire or by using stamped, cut or etched conductor techniques.

In the distributed winding of FIG. 4B, the left edge conductor and the right edge conductor have only a ±30° spatial distribution. Therefore, there are no empty spaces and the resultant force of the edge conductors is cos(30°)= 0.866. In addition, because the coil is a continuous distributed winding, it avoids having multiple conductors in one area, as with individual coils, and the problem of overlapping coils is eliminated. This makes it possible to consider alternate winding patterns that might serve to increase Km or improve force ripple further.

Figure 5A:
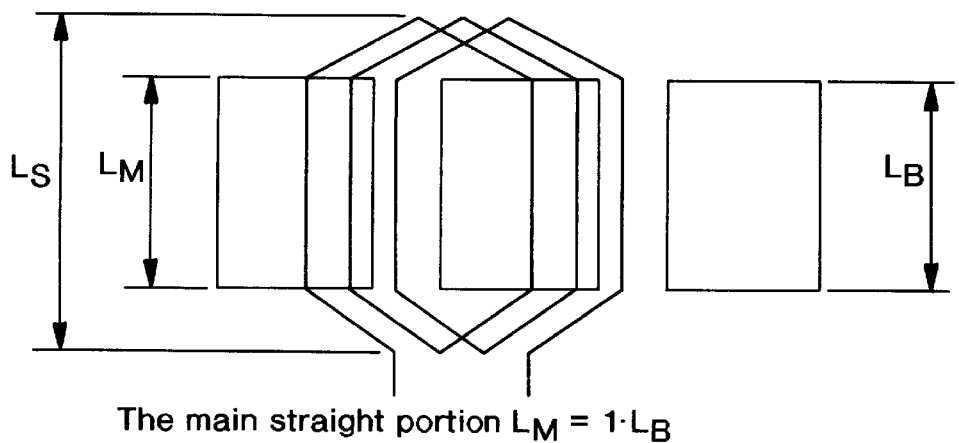
FIGS. 5A to 5C show multiple turns of distributed windings with different straight portion lengths.
Figure 5B:
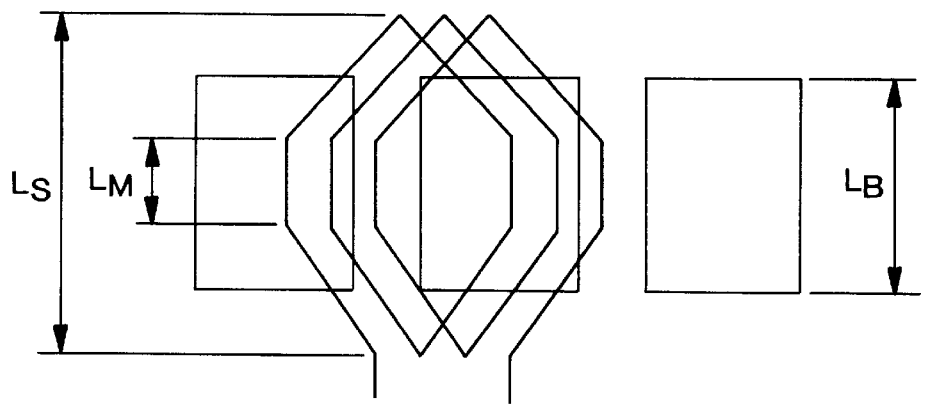
Figure 5C:
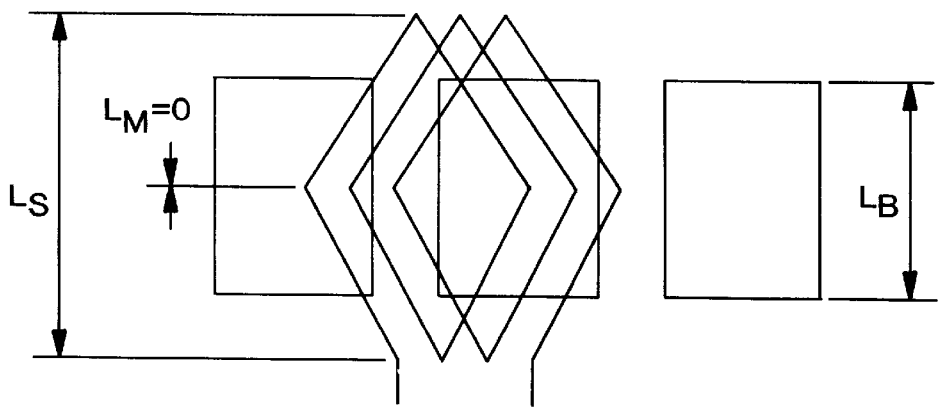

FIGS. 4A to 4C show one coil turn of a distributed winding where the length of the main straight portion $L_M$ of the conductor is adjusted as a ratio of the active height of the magnet $L_B$. $L_S$ is the total height of the conductor pattern. FIGS. 5A to 5C show multiple turns of this distributed winding in a lap configuration. By adjusting the ratios of $L_M$, $L_S$ and $L_B$, the optimum motor constant Km and force ripple can be achieved.

When the winding pattern is adjusted by changing the main straight portion $L_M$ or by changing the total height $L_S$, three things are affected: the motor back emf (Ke), the winding electrical resistance, and the developed force ripple. The motor force constant (Kf), and its relationship to the back emf (Ke), also changes as the motor back emf wave shape changes. For convenience the motor force constant and the winding electrical resistance are combined into one meaningful parameter Km, referred to as the motor constant.

For most linear motor applications, optimizing Km is of primary importance. However, the resultant force ripple when driven by a sinusoidal drive must also be kept in view.

Tables 1–4 show the result when $L_M$ and $L_S$ are adjusted for a given magnet height $L_B$:

TABLE 1

| | | | | | | | |
|---|---|---|---|---|---|---|---|
| $L_B$—Magnet Height | 1.0 | 1.0 | 1.0 | 1.0 | 1.0 | 1.0 | 1.0 |
| $L_S$—Total Height of Conductor Pattern | 1.35 | 1.35 | 1.35 | 1.35 | 1.35 | 1.35 | 1.35 |

TABLE 1-continued

| | | | | | | | |
|---|---|---|---|---|---|---|---|
| $L_M$—Straight Portion | 1 | 0.8 | 0.6 | 0.4 | 0.2 | 0.1 | 0 |
| Winding Resistance (Ohms) | 0.188 | 0.167 | 0.157 | 0.151 | 0.147 | 0.145 | 0.144 |
| Bemf (Volts/in/Sec) | 1.91 | 1.92 | 1.92 | 1.92 | 1.90 | 1.89 | 1.89 |
| Kf (Newtons/Amp) | 2.82 | 2.80 | 2.70 | 2.56 | 2.39 | 2.31 | 2.23 |
| Km—Motor Constant | 3.76 | 3.95 | 3.93 | 3.81 | 3.61 | 3.50 | 3.40 |
| Force Ripple (%) | 12.6 | 10.1 | 8.0 | 5.9 | 4.0 | 3.2 | 3.0 |

TABLE 2

| | | | | | | | |
|---|---|---|---|---|---|---|---|
| $L_B$ | 1.0 | 1.0 | 1.0 | 1.0 | 1.0 | 1.0 | 1.0 |
| $L_S$ | 1.2 | 1.2 | 1.2 | 1.2 | 1.2 | 1.2 | 1.2 |
| $L_M$ | 1 | 0.8 | 0.6 | 0.4 | 0.2 | 0.1 | 0 |
| Winding Resistance (Ohms) | 0.220 | 0.176 | 0.160 | 0.152 | 0.147 | 0.145 | 0.144 |
| Bemf (Volts/in/Sec) | 2.15 | 2.15 | 2.15 | 2.13 | 2.09 | 2.07 | 2.04 |
| Kf (Newtons/Amp) | 3.18 | 3.11 | 2.95 | 2.76 | 2.55 | 2.45 | 2.35 |
| Km | 3.91 | 4.28 | 4.26 | 4.09 | 3.85 | 3.71 | 3.57 |
| Force Ripple (%) | 12.7 | 10.4 | 8.5 | 6.9 | 5.3 | 4.4 | 3.5 |

TABLE 3

| | | | | | | | |
|---|---|---|---|---|---|---|---|
| $L_B$ | 1.0 | 1.0 | 1.0 | 1.0 | 1.0 | 1.0 | 1.0 |
| $L_S$ | 1.1 | 1.1 | 1.1 | 1.1 | 1.1 | 1.1 | 1.1 |
| $L_M$ | 1.0 | 0.8 | 0.6 | 0.4 | 0.2 | 0.1 | 0 |
| Winding Resistance (Ohms) | 0.217 | 0.187 | 0.163 | 0.153 | 0.147 | 0.145 | 0.144 |
| Bemf (Volts/in/Sec) | 2.35 | 2.35 | 2.32 | 2.26 | 2.19 | 2.16 | 2.13 |
| Kf (Newtons/Amp) | 3.43 | 3.34 | 3.13 | 2.89 | 2.64 | 2.52 | 2.40 |
| Km | 4.15 | 4.47 | 4.47 | 4.26 | 3.97 | 3.81 | 3.66 |
| Force Ripple (%) | 12.9 | 10.8 | 9.4 | 7.9 | 6.2 | 5.3 | 4.3 |

TABLE 4

| | | | | | | | |
|---|---|---|---|---|---|---|---|
| $L_B$ | 1.0 | 1.0 | 1.0 | 1.0 | 1.0 | 1.0 | 1.0 |
| $L_S$ | 1.0 | 1.0 | 1.0 | 1.0 | 1.0 | 1.0 | 1.0 |
| $L_M$ | 0.9 | 0.8 | 0.6 | 0.4 | 0.2 | 0.1 | 0 |
| Winding Resistance (Ohms) | 0.276 | 0.205 | 0.167 | 0.154 | 0.148 | 0.146 | 0.144 |
| Bemf (Volts/in/Sec) | 2.53 | 2.49 | 2.41 | 2.33 | 2.24 | 2.2 | 2.16 |
| Kf (Newtons/Amp) | 3.66 | 3.52 | 3.24 | 3.00 | 2.69 | 2.55 | 2.43 |
| Km | 4.26 | 4.52 | 4.58 | 4.36 | 4.04 | 3.86 | 3.69 |
| Force Ripple (%) | 13.1 | 11.4 | 10.2 | 8.6 | 6.8 | 5.7 | 4.7 |

Figure 6:
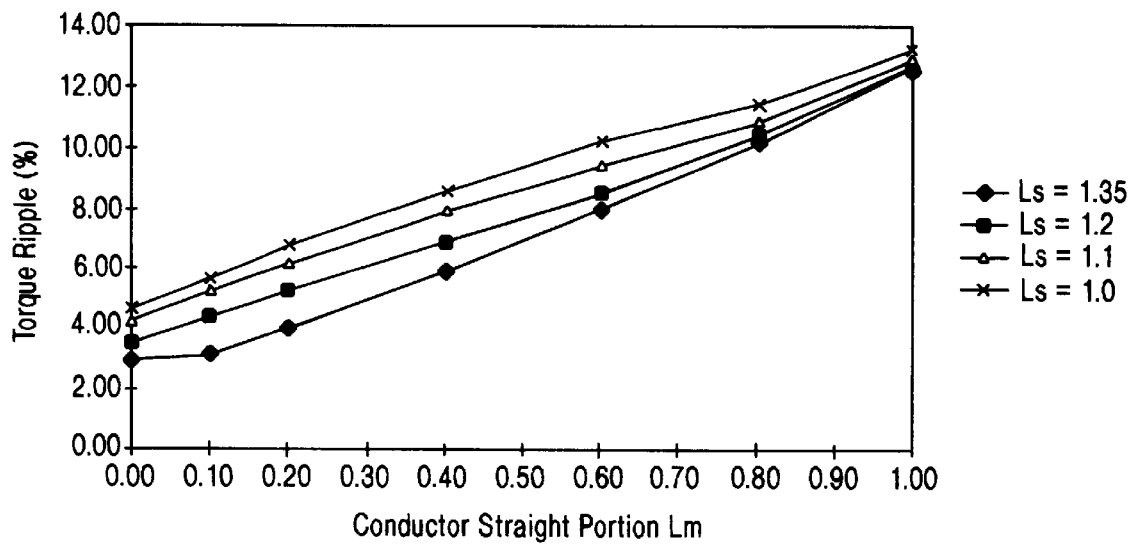
FIG. 6 is a data tabulation of torque ripple versus the length of the conductor straight portion.

The data shows that the optimum winding pattern for minimizing force ripple is not the same pattern for optimizing the motor constant Km. Therefore, depending on the application, some compromise between these two patterns is required. The torque ripple data is tabulated in FIG. 6. For minimum torque ripple the length of the straight portion should be zero or close to zero.

The data also shows that the conventional teaching of the prior art does not apply. According to the conventional teaching, the coil active length should be substantially straight and perpendicular to the direction of travel, and therefore, the magnetic flux emanating from the ferromagnetic plates does not produce and optimal linear motor. Instead, although the force constant is maximized, as intuitive teaching would suggest, when the coil active length $L_M$ is substantially straight and at its longest length, optimum Km and force ripple occur at other configurations. In fact, the data shows that optimal Km occurs when $L_M$ is equal to $L_B$ which essentially means that the end turns in the inactive area have been reduced to zero. This data is summarized in the table of FIG. 7.

Figure 7:
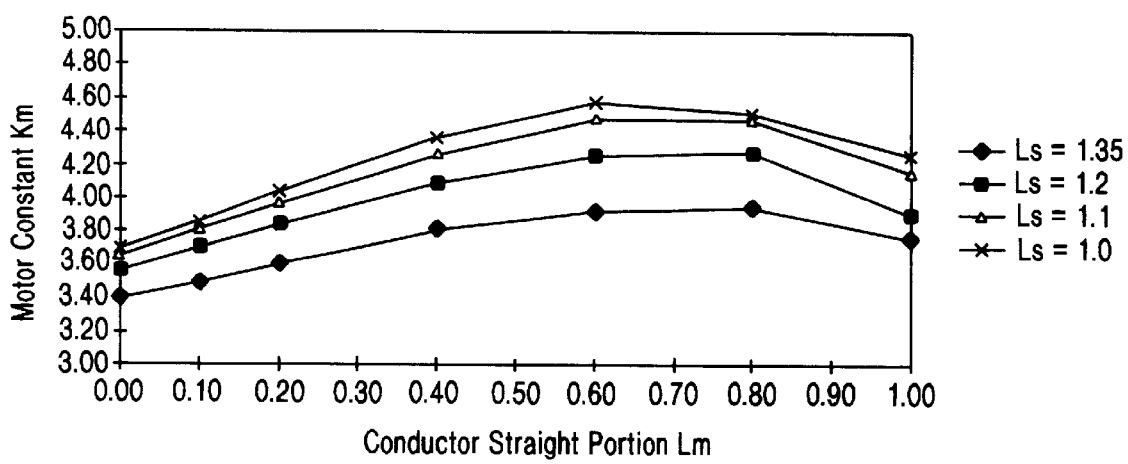
FIG. 7 is a data tabulation of the motor constant versus the length of the conductor straight portion.

As shown in FIG. 7 the maximum motor constant occurs at about 70% straight portion length. High motor constant values are achieved when the straight portion is greater than 50% and preferably in the range of 50% to 85%.

The foregoing disclosure describes a preferred embodiment of the invention. It will be obvious to those skilled in the art that the present invention is applicable to ironless motors with distributed windings, whether wire, wound, stamped, cut or etched. The invention is likewise applicable to windings with multi-turn coils which overlap one another. The motor according to the invention provides increased flexibility to adjust winding patterns for optimum advantage in an ironless linear motor such that optimum patterns can be established for maximum motor constant and minimum force ripple.

What is claimed is:

1. A slotless linear motor with a distributed winding comprising:
   a plurality of permanent magnets providing alternating magnetic pole faces disposed along a linear air gap of predetermined height;
   a distributed linear winding of predetermined outside dimensions located at least in part in said air gap and including
      a plurality of layered conductor patterns, and
      insulation between adjacent ones of said conductor patterns;
   said linear winding and said alternating magnetic pole faces being mounted for relative linear movement;
   said layered conductor patterns including conductor portions of predetermined length perpendicular to the direction of said linear movement;
   the length of said perpendicular conductor portion, the height of said linear air gap and the outside dimension of said winding being selected according to desired performance characteristics;
   magnetic material providing a flux return path for said permanent magnets and across said linear air gap; and
   means for energizing said winding according to the position of said winding relative to said permanent magnets,
   wherein the length of said perpendicular conductor portion is small or close to zero to achieve minimum torque ripple.

2. A slotless linear motor with a distributed winding comprising:
   a plurality of permanent magnets providing alternating magnetic pole faces disposed along a linear air gap of predetermined height;
   a distributed linear winding of predetermined outside dimensions located at least in part in said air gap and including
      a plurality of layered conductor patterns, and
      insulation between adjacent ones of said conductor patterns;
   said linear winding and said alternating magnetic pole faces being mounted for relative linear movement;
   said layered conductor patterns including conductor portions of predetermined length perpendicular to the direction of said linear movement;
   the length of said perpendicular conductor portion, the height of said linear air gap and the outside dimension of said winding being selected according to desired performance characteristics;
   magnetic material providing a flux return path for said permanent magnets and across said linear air gap; and
   means for energizing said winding according to the position of said winding relative to said permanent magnets,
   wherein the length of said perpendicular conductor portion is greater then 50% of the linear air gap height and said length of said perpendicular conductor portion is between 50% and 85% to obtain a maximum motor constant.

3. A slotless linear motor including at least one permanent magnet providing pole faces disposed along a linear air gap, comprising a distributed linear winding including a plurality of conductors secured to an insulating layer and movable relative to said pole faces;
   said conductors being configured so that at least a part of each such conductor $L_M$ is generally perpendicular to the direction of movement and the ratio of the length of said generally perpendicular portion to the height $L_S$ of said linear air gap winding is selected according to desired performance characteristics,
   wherein the ratio $L_M \cdot L_S$ is small to obtain low resistance and a generally sinusoidal wave shape.

4. A slotless linear motor with a distributed winding comprising:
   a plurality of permanent magnets providing alternating magnetic pole faces disposed along a linear air gap of predetermined height;
   a distributed linear winding of predetermined outside dimensions located at least in part in said air gap, said distributed linear winding being made of insulated wire secured to a substrate;
   said linear winding and said alternating magnetic pole faces being mounted for relative linear movement;
   said linear insulated wire winding including conductor portions of predetermined length perpendicular to the direction of said linear movement;
   the length of said perpendicular conductor portion, the height of said linear air gap and the outside dimension of said winding being selected according to desired performance characteristics;
   magnetic material providing a flux return path for said permanent magnets and across said linear air gap; and
   means for energizing said winding according to the position of said winding relative to said permanent magnets,
   wherein the length of said perpendicular conductor portion is small or close to zero to achieve minimum torque ripple.

5. A slotless linear motor with a distributed winding comprising:
   a plurality of permanent magnets providing alternating magnetic pole faces disposed along a linear air gap of predetermined height;
   a distributed linear winding of predetermined outside dimensions located at least in part in said air gap, said distributed linear winding being made of insulated wire secured to a substrate;
   said linear winding and said alternating magnetic pole faces being mounted for relative linear movement;
   said linear insulated wire winding including conductor portions of predetermined length perpendicular to the direction of said linear movement;
   the length of said perpendicular conductor portion, the height of said linear air gap and the outside dimension of said winding being selected according to desired performance characteristics;
   magnetic material providing a flux return path for said permanent magnets and across said linear air gap; and
   means for energizing said winding according to the position of said winding relative to said permanent magnets,
   wherein the length of said perpendicular conductor portion is greater than 50% of the linear air gap height and said length of said perpendicular conductor portion is between 50% and 85% to obtain a maximum motor constant.

6. A slotless linear motor with a distributed winding comprising:
   a plurality of permanent magnets providing alternating magnetic pole faces disposed along a linear air gap of predetermined height;
   a distributed linear winding of predetermined outside dimensions located at least in part in said air gap and including
   a plurality of layered conductor patterns providing coil half-turns of said distributed linear winding,
      an insulation layer between adjacent ones of said conductor patterns, and
      interconnections between said layered conductor patterns so that coils are formed including coil half-turns in different layers;
   said linear winding and said alternating magnetic pole faces being mounted for relative linear movement;
   each of said coil half-turns in said layered conductor patterns including a conductor portion of predetermined length perpendicular to the direction of said linear movement;
   the length of said perpendicular conductor portions, the height of said linear air gap, and the outside dimension of said winding being selected according to desired performance characteristics;
   magnetic material providing a flux return path for said permanent magnets and across said linear air gap; and
   means for energizing said winding according to the position of said winding relative to said permanent magnets,
   wherein the length of said perpendicular conductor portion is small or close to zero to achieve minimum torque ripple.

7. A slotless linear motor with a distributed winding comprising:
   a plurality of permanent magnets providing alternating magnetic pole faces disposed along a linear air gap of predetermined height;
   a distributed linear winding of predetermined outside dimensions located at least in part in said air gap and including
   a plurality of layered conductor patterns providing coil half-turns of said distributed linear winding,
      an insulation layer between adjacent ones of said conductor patterns, and
      interconnections between said layered conductor patterns so that coils are formed including coil half-turns in different layers;
   said linear winding and said alternating magnetic pole faces being mounted for relative linear movement;
   each of said coil half-turns in said layered conductor patterns including a conductor portion of predetermined length perpendicular to the direction of said linear movement;
   the length of said perpendicular conductor portions, the height of said linear air gap, and the outside dimension of said winding being selected according to desired performance characteristics;
   magnetic material providing a flux return path for said permanent magnets and across said linear air gap; and
   means for energizing said winding according to the position of said winding relative to said permanent magnets,
   wherein the length of said perpendicular conductor portion is greater than 50% of the linear air gap height and said length of said perpendicular conductor portion is between 50% and 85% to obtain a maximum motor constant.

* * * * *